United States Patent [19]

Hakamada

[11] Patent Number: 5,428,677
[45] Date of Patent: Jun. 27, 1995

[54] TELEPHONE CARD HAVING CALENDAR FUNCTION AND SYSTEM FOR USING SAME

[76] Inventor: Ikuhiro Hakamada, Yushima 3-29-3-502, Bunkyo-ku, Tokyo Prefecture, Japan

[21] Appl. No.: 50,129
[22] PCT Filed: Mar. 9, 1992
[86] PCT No.: PCT/JP92/00277
  § 371 Date: Dec. 16, 1993
  § 102(e) Date: Dec. 16, 1993
[87] PCT Pub. No.: WO93/01943
  PCT Pub. Date: Feb. 4, 1993
[51] Int. Cl.⁶ .......... H04M 17/00; G06K 5/00; G06K 19/06; G06F 7/08
[52] U.S. Cl. .......... 379/144; 379/357; 235/380; 235/381; 235/492
[58] Field of Search .......... 379/166, 91, 357; 235/380, 381, 492

[56] References Cited
U.S. PATENT DOCUMENTS

| | | | |
|---|---|---|---|
| 163,520 | 5/1875 | Petersohn | 283/2 |
| 3,464,200 | 9/1969 | Merrick | 283/2 |
| 4,326,123 | 4/1982 | Hosterman | 235/380 |
| 4,706,275 | 11/1987 | Kamil | 379/144 |
| 4,973,828 | 11/1990 | Naruse et al. | 235/380 |
| 5,144,649 | 9/1992 | Zickey | 379/144 |
| 5,266,782 | 11/1993 | Alanara | 379/144 |
| 5,272,320 | 12/1993 | Hakamada | 235/381 |
| 5,272,747 | 12/1993 | Meads | 379/144 |

OTHER PUBLICATIONS

U.S. Ser. No. 08/005,862 filed Jan. 13, 1993 entitled "Telephone Card Having Calendar and System for Issuing and Using Same" which is a File Wrapper Continuation of U.S. Ser. No. 07/732,204 filed Jul. 18, 1991, now abandoned.
International Application PCT/JP92/00756 filed Jun. 15, 1992 which entered the national phase in the U.S. on Mar. 18, 1993 entitled "Container for Sealedly Packing Content Having a Calendar Function and Automatic Vending Machine for Said Container".

Primary Examiner—Stephen Chin
Assistant Examiner—Vijay Shankar
Attorney, Agent, or Firm—Howson & Howson

[57] ABSTRACT

A calendar is provided on a telephone card to enhance its usefulness. A telephone set displaying the calendar allows a user to refer to it during a telephone call. A telephone card reader, a telephone card insertion slot, and a number-of-calls counting apparatus constitute a separate, unitary telephone card accepting apparatus. This improves handling characteristics and reduces the weight of the telephone set. A storage box within the telephone set provides a disposal system for used cards.

8 Claims, 17 Drawing Sheets

IN 1990.
5 MAY

| Sun. | Mon. | Tue. | Wed. | Thu. | Fri. | Sat. |
|------|------|------|------|------|------|------|
| ·    | ·    | 1    | 2    | 3    | 4    | 5    |
| 6    | 7    | 8    | 9    | 10   | 11   | 12   |
| 13   | 14   | 15   | 16   | 17   | 18   | 19   |
| 20   | 21   | 22   | 23   | 24   | 25   | 26   |
| 27   | 28   | 29   | 30   | 31   | ·    | ·    |

TELEPHONE CARD HAVING CALENDAR FUNCTION AND SYSTEM FOR USING SAME

TECHNICAL FIELD

The present invention relates to a telephone card which has been widely used recently in place of coins at a public telephone, etc, and to a system of using such telephone card.

BACKGROUND ART

Telephone cards, which have been widely used recently, are sold and used with a variety of designs, etc. printed thereon. Such telephone cards as having scenery pictures printed thereon as they are and as having specific information of each shop printed thereon for advertising the shop are sold and used. Now, a mechanism of an ordinary telephone set 16 will be explained using FIG. 17 and FIG. 18. A telephone card inserted through a telephone card insertion slot 6 is transferred through a first transfer means 10 to a telephone card fixing part 8. A remaining number-of-calls (messages) of the telephone card is counted by a number-of-calls counting means 12 at the telephone card fixing part 8 and that remaining number-of-calls is displayed by a number-of-calls display means 14. When this remaining number-of-calls is not zero and a receiver 62 is off a receiver receptacle 64, a state capable of number designation is secured by a means 28 to allow an acceptance of a designated number. Ordinarily, continuous sounds, "pi, . . . " are generated. When a number to be called is designated by a number designating means 30 with dial or push button, etc. under such state, the telephone set is placed in a state where speaking with the party called can be made as the party called picks up the telephone set by an action of a circuit coupling means 32. And when the remaining number-of-calls in the telephone card becomes zero or the receiver 62 is placed onto the receiver receptacle 64, the speaking with the other party becomes impossible by an action of a circuit breaking means 38.

In general, telephone cards are consumable commodity made of flexible rigid material, therefore they are ordinarily discarded when used up. Telephone cards discarded can be seen around a public telephone and it is not desirable from the stand point of keeping clean environment.

Also, the trend of providing a variety of elaborate design or pattern printed on telephone cards for securing greater sales is rapidly increasing, therefore telephone cards which have direct and concrete benefits for daily life is rather scarce.

Further, as these telephone cards are made of flexible rigid material being different from paper, they do not easily undergo permanent deformation or destruction.

Under the circumstance, the present invention is made to solve the above mentioned problems while using said special features of telephone cards, and is intended to supply such telephone cards as directly useful for daily life by providing a calendar function on the telephone cards, and to enhance the usefulness of the used telephone cards, and at the same time to provide an advantageous system for using telephone cards.

DISCLOSURE OF THE INVENTION

The present invention discloses a telephone card having a calendar function characterized by that at least a portion of calendar is inscribed on one surface or on both surfaces of the telephone card. Further, a telephone card having a calendar function characterized by that such part of information as determined by a specific date or specific period of time corresponding to part of the calender is also inscribed along the calendar. Here, the specific date means a birthday for an individual, etc. and the specific period of time means a period of time when the constellation is common, etc.

The present invention is, also, to provides a telephone set having a telephone card insertion slot into which a telephone card is inserted, a first transfer means for transferring the telephone card from the insertion slot to a telephone card fixing part, a number-of-calls counting means for counting a remaining number-of-calls that can be made at the telephone card fixing part, and a number-of-calls display means for displaying said remaining number-of-calls that can be made, characterized by having a print reading means for reading the printed information on a surface of the telephone card and a printed information display part for displaying such printed information. The printed information on a surface of the telephone card means, for example, a calendar, etc. inscribed on a surface of the telephone card in a case of the above mentioned telephone card having a calendar function.

The present invention is also to provide a telephone set having a telephone card insertion slot into which a telephone card is inserted, a first transfer means for transferring the telephone card from the insertion slot to a telephone card fixing part, a number-of-calls counting means for counting a remaining number-of-calls that can be made at the telephone card fixing part, and a number-of-calls display means for displaying the remaining number-of-calls that can be made, characterized by that a print reading means for reading the printed information on a surface of the telephone card and a printed information display part for displaying such printed information are provided therein and at the same time the above mentioned telephone card fixing part and the printed information display part are formed into mechanically separate bodies and further that the above mentioned printed information display part and the print reading means are connected together by an electrically synchronizing mechanism. The electrically synchronizing mechanism here includes an ordinary electric cord, etc.

The present invention is also to provide a telephone system having a telephone card insertion slot into which a telephone card is inserted, a first transfer means for transferring the telephone card from the insertion slot to a telephone card fixing part, a number-of-calls counting means for counting a remaining number-of-calls that can be made at the telephone card fixing part, a number-of-calls display means for displaying the remaining number-of-calls that can be made, a means to allow an acceptance of a designated number by which an acceptance of a designated number can be made if the remaining number-of-calls is not zero, a circuit coupling means to allow a speaking with the party called by operating a number designating means, and a circuit breaking means for breaking the circuit, characterized by that the above mentioned telephone card insertion slot, the telephone card fixing part, the first transfer means, the number-of-calls counting means, and the number-of-calls display means are formed as a mechanically separate body from the above mentioned number designating means, the means to allow an acceptance of a designated number, the circuit coupling means, and the circuit breaking means. The "formed as a mechanically separate body" here means that both bodies or portions can be carried around in a state they are physically separated from each other but can be electrically connected with an electric cord, etc. when required.

Also, the number-of-calls counting means and the number-of-calls display means are either electrically connected or are connectable to each other.

Also, the telephone card insertion slot may also serve as a telephone card discharging outlet in some cases.

Further, the present invention is to provide a telephone card accepting means used in the above mentioned telephone system, characterized by that the above mentioned telephone card insertion slot, the telephone card fixing part, the first transfer means, the number-of-calls counting means, and the number-of-calls display means are provided and that it can be electrically connected to outside telephone sets. Therefore, the above mentioned telephone card accepting means and the telephone set can be carried around in a physically separated state but can be electrically connected with an electric cord, etc. when required.

Also, the present invention is to provide a telephone set used in the above mentioned telephone system, characterized by that the above mentioned means to allow an acceptance of a designated number and the circuit coupling means which allows a speaking with the party called by operating the the number designating means as well as the circuit breaking means for breaking the circuit are provided and at the same time the telephone set can be electrically connected to the above mentioned telephone card accepting means.

The present invention is also to provide a telephone system having a telephone card insertion slot into which a telephone card is inserted, a first transfer means for transferring the telephone card from the insertion slot to a telephone card fixing part, a number-of-calls counting means for counting a remaining number-of-calls that can be made at the telephone card fixing part, a number-of-calls display means for displaying the remaining number-of-calls that can be made, a means to allow an acceptance of a designated number by which an acceptance of a designated number can be made if the remaining number-of-calls is not zero, a circuit coupling means to allowing a speaking with the party called by operating the number designating means, and a circuit breaking means for breaking the circuit, characterized by that the above mentioned telephone card insertion slot, the telephone card fixing part, the first transfer means, and the number-of-calls counting means are formed as a mechanically separate body from the above mentioned number designating means, the means to allow an acceptance of a designated number, the circuit coupling means, the circuit breaking means, and the number-of-calls display means. Thus, this telephone system is different from the telephone system mentioned above in that the number-of-calls display means and the number-of-calls counting means are mechanically formed as separate bodies.

Further, the present invention is to provide a telephone card accepting means used in the above mentioned telephone system, characterized by that the above mentioned telephone card insertion slot, the telephone card fixing part, the first transfer means, and the number-of-calls counting means are provided and that it can be electrically connected to outside telephone sets.

Also, the present invention is to provide a telephone set used in the above mentioned telephone system, characterized by that the above mentioned means to allow an acceptance of a designated number, the circuit coupling means to allow a speaking with the party called by operating the number designating means, the number-of-calls display means for displaying the remaining number-of-calls that can be made, and the circuit breaking means for breaking the circuit are provided, and at the same time the telephone set is electrically connectable to the above mentioned telephone card accepting means.

Also, the present invention is to provide a telephone set in which a telephone card can be used and a number-of-calls counting means for counting a remaining number-of-calls left in the telephone card that can be made and a second transfer means for transferring the telephone card to a telephone card discharging outlet when the card is determined to have zero remaining number-of-calls are provided, characterized by having a third transfer means for transferring a telephone card to a storage box which stores the telephone cards when the card is determined to have zero remaining number-of-calls as mentioned above and a change over means which can make a change over for selecting to which one of the above mentioned second or third transfer means the transfer is to be made, when the card is determined to have zero remaining number-of-calls as mentioned above. The storage box here may be fixedly provided in the telephone set or may be so provided at the telephone set as removable from the same.

Also, the present invention is to provide a telephone set in which a telephone card can be used, characterized by having a number-of-calls counting means for counting a remaining number-of-calls left in the telephone card that can be made and a third transfer means for transferring a telephone card to a storage box which stores the telephone cards when the card is determined to have zero remaining number-of-calls.

BRIEF DESCRIPTION OF THE DRAWINGS

FIG. 2 shows examples of the use of the telephone cards having calendar function according to the present invention.

BEST MODE FOR CARRYING OUT THE INVENTION

Figure 1:
FIGS. 1, 3, 4, 5, 6, 7, and 8 are plans showing telephone cards having calendar function according to the present invention.

Now, examples of telephone cards having a calendar function according to the present invention shall be explained referring to the drawings.

FIG. 1 is a drawing to show the first example of the present invention.

A calendar for one month of May, 1990 is inscribed on one surface of a telephone card. With this telephone card, a telephone card can be used as a calendar, and advantages of a telephone card is enhanced. For example, it happens rather frequently to find out information about the calendar before making a telephone call, and in such a case the information on the calendar can be readily obtained at the same time when a telephone card, which is a must for making a call, is taken out, eliminating the need to make another action of taking out a separate calendar table, which makes the telephone card very useful.

Figure 2:
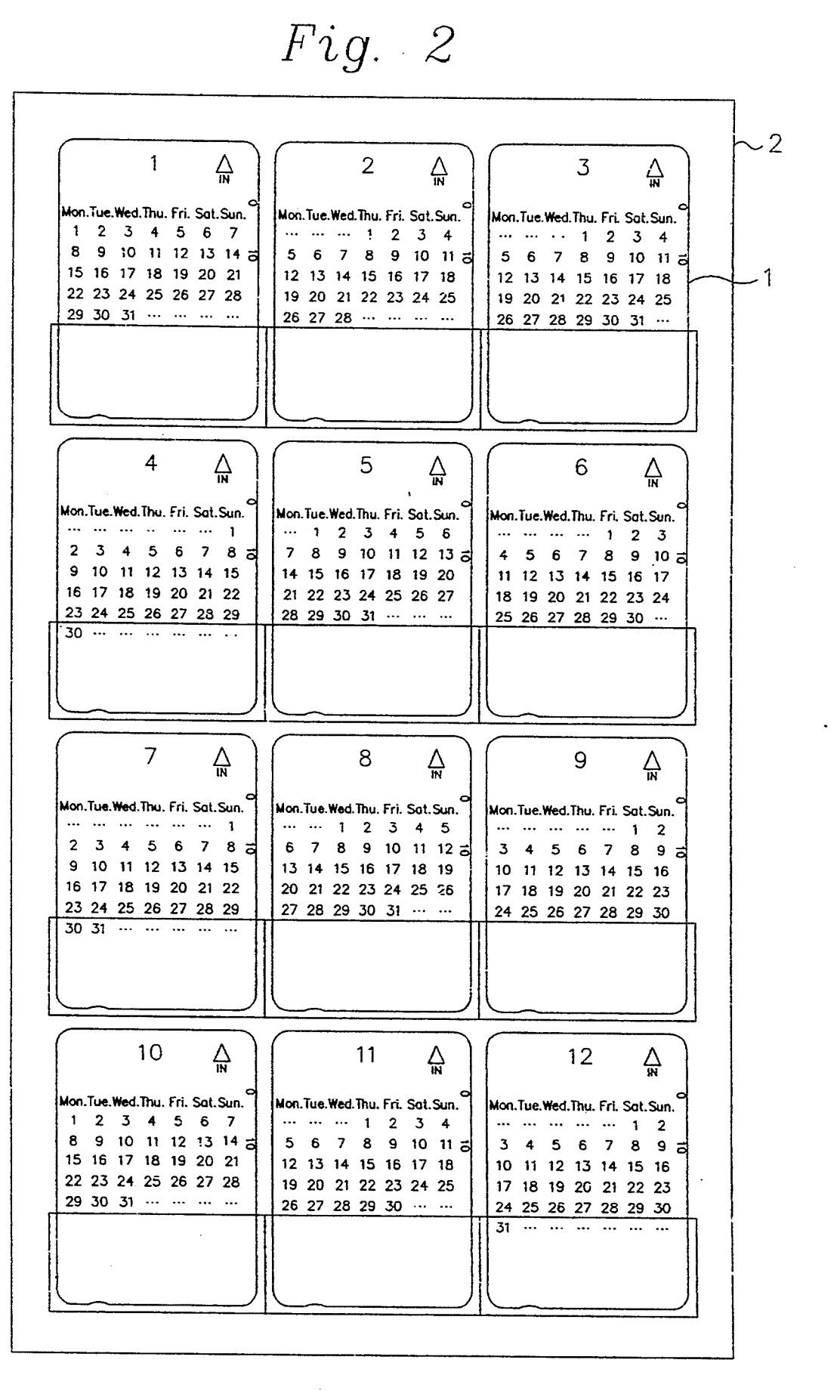

Further, even after telephone cards have been used up, they can be used as a calendar table, thus the used telephone cards which have been hitherto simply discarded may be reused. For example, used telephone cards (not necessarily limited to used telephone cards) may be inserted in a holder into which the cards can be placed one by one as shown in FIG. 2, then the holder can be used as an ordinary calendar table. Thus the telephone cards may be used continuously. Further, as telephone cards are made of rigid material they can be used semi-permanently being different from paper.

Figure 3:
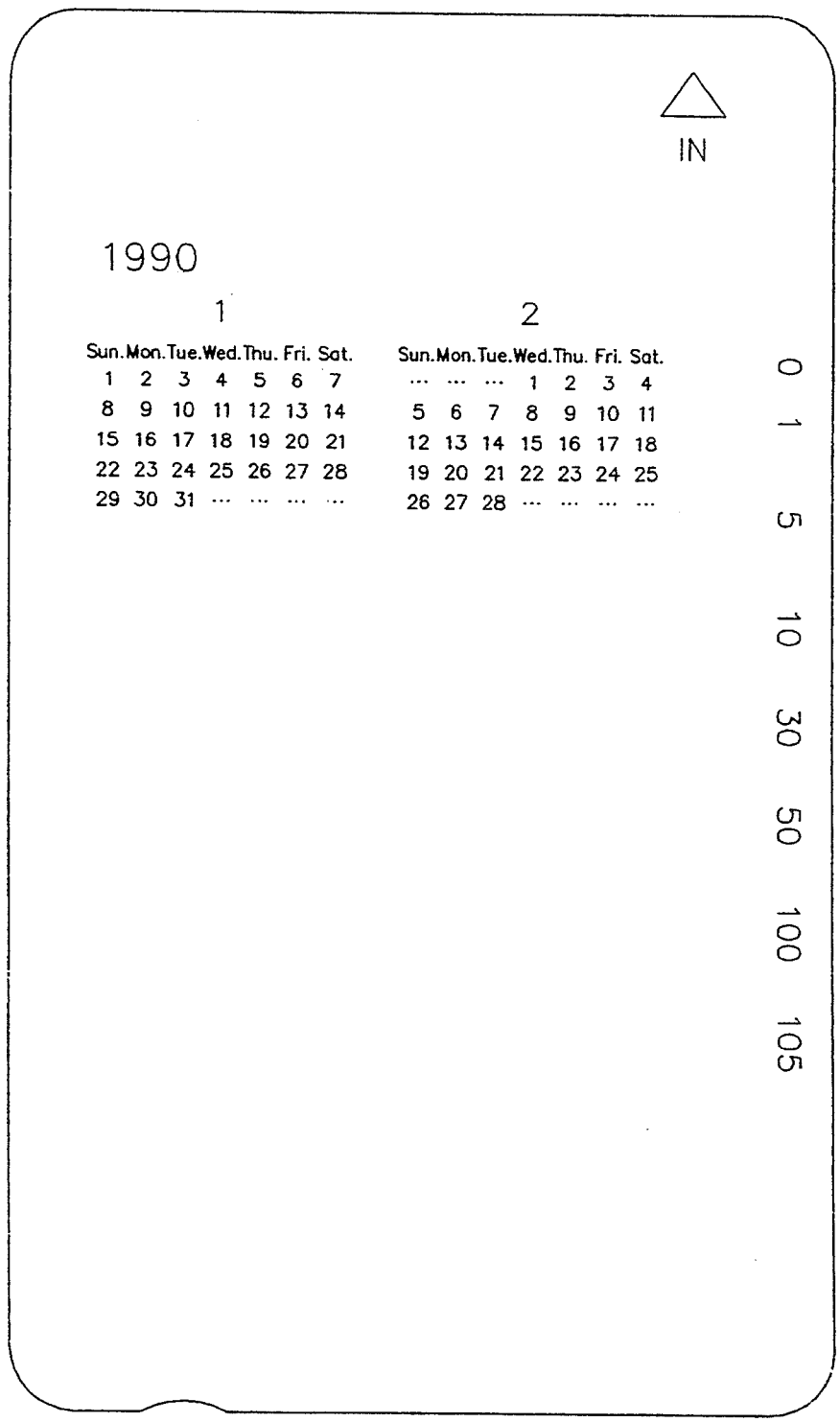

FIG. 3 is a drawing to show the second example of the present invention. Being different from the first example, calendars for two months are shown there. As compared with the first example, information on two month's calendar can be obtained from one telephne card, enhancing the value for a user.

Figure 4:
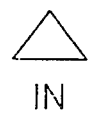

FIG. 4 is a drawing to show the third example of the present invention. Being different from the first and second examples, information on a calendar for full one year that is twelve months is inscribed thereon, thus information on a calendar for one year can be obtained from one telephone card, which further enhances the value for a user.

FIG. 5 to FIG. 8 show are drawings to show examples of the present invention with further improvements. That is, such information as determined by a specific date or a specific period of time is inscribed besides an ordinary calendar, thus providing telephone cards which are prepared solely for a use in connection with that specific date or specific period of time. These examples show applications of telephone cards to specific purposes corresponding to the trend of diversifying variety in the demand pattern.

Figure 5:
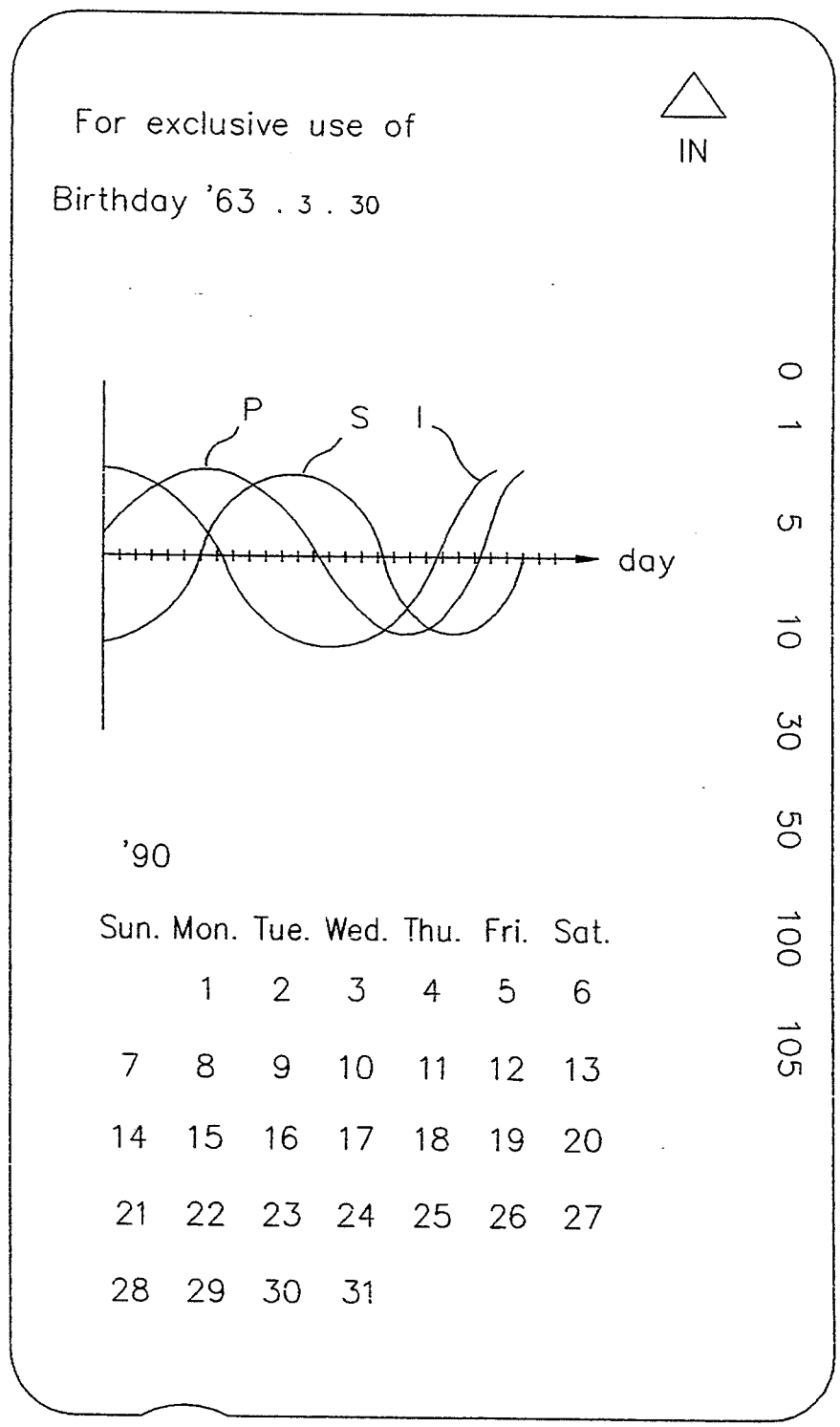

FIG. 5 is a drawing to show the fourth example of the present invention and has a biorhythm table in that calendar of a person born on 30th of March, 1963 printed thereon along with the calendar of one month. That is a telephone card solely for a certain specific date which is a birthday of an individual person.

The biorhythm is information determined through a prescribed calculation based on a birthday of each person, and is made of the three rhythms i.e. physical (P), sensitive (S), and intellectual (I) rhythms, each of which has a cycle of 23 days, 28 days and 33 days respectively.

Each person can supposedly enjoy life with greater significance by making his/her life plan based on such biorhythm information, therefore it is quite necessary to find out the viorhythm information of the day or in the month instantly during a daily life.

By using the telephone card shown as the fourth example, that is by using a telephone card prepared solely for one's own birthday, the biorhythm information of the day and/or month can be instantly learnt, thus the usefulness of this telephone card is very much enhanced. As a result, this telephone card can be used as an information source on the calendar+biorhythm information before it is used, and can perform its very function as a telephone card during the use, then it serves as an information source for the calendar+biorhythm, thus the usefulness of this telephone card is very high.

Figure 6:
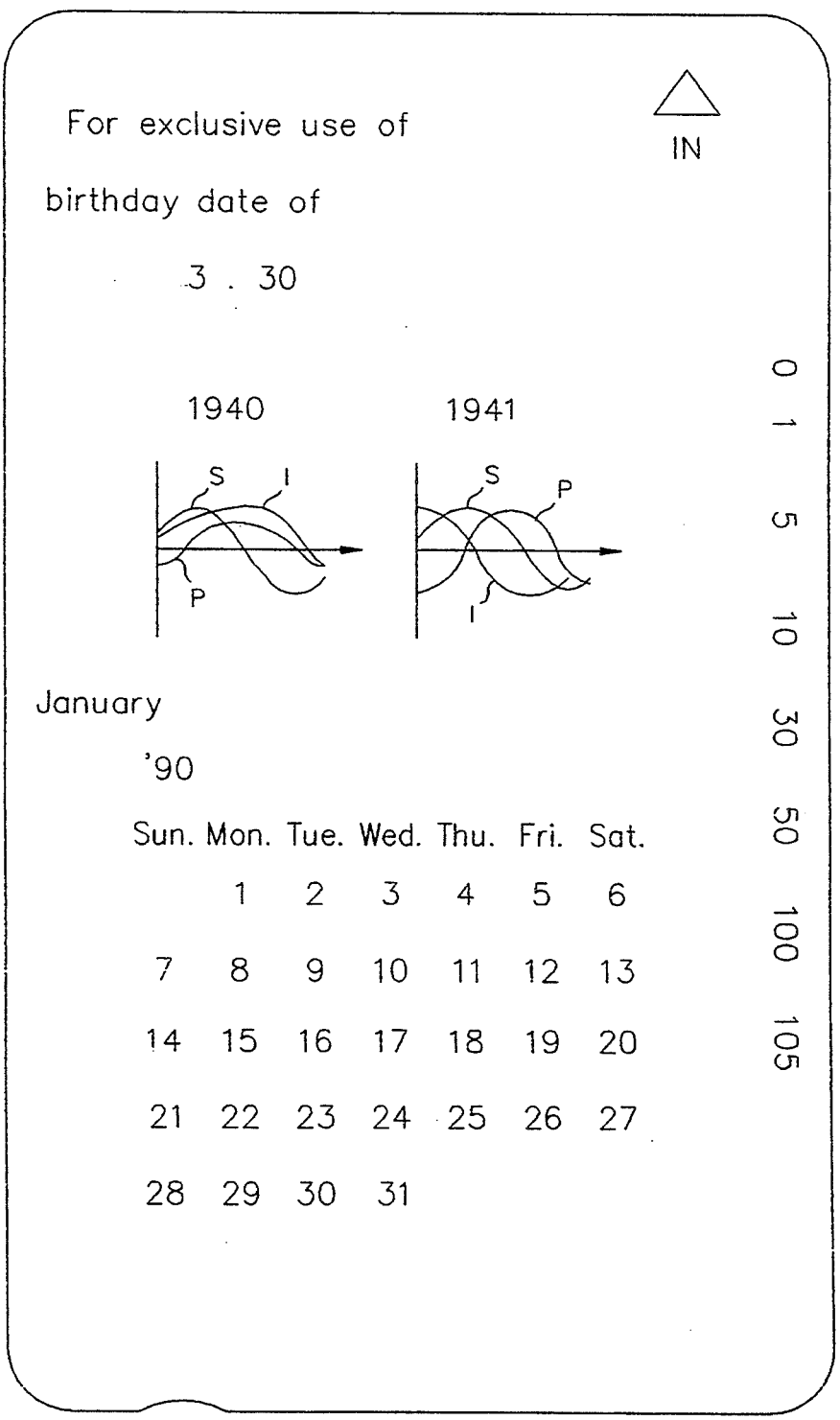

FIG. 6 is a drawing to show the fifth example of the present invention. Being different from the fourth example, it is a telephone card where the day and month only of one's birthday are made as the specified date excluding the year of birth.

This telephone card has a plurality of biorhythm tables based on the year of birth inscribed thereon. Each individual can instantly learn the biorhythm information of the day when the biorhythm table for the year of one's birth is found by using a telephone card corresponding to the day and month of his/her birth.

Figure 7:
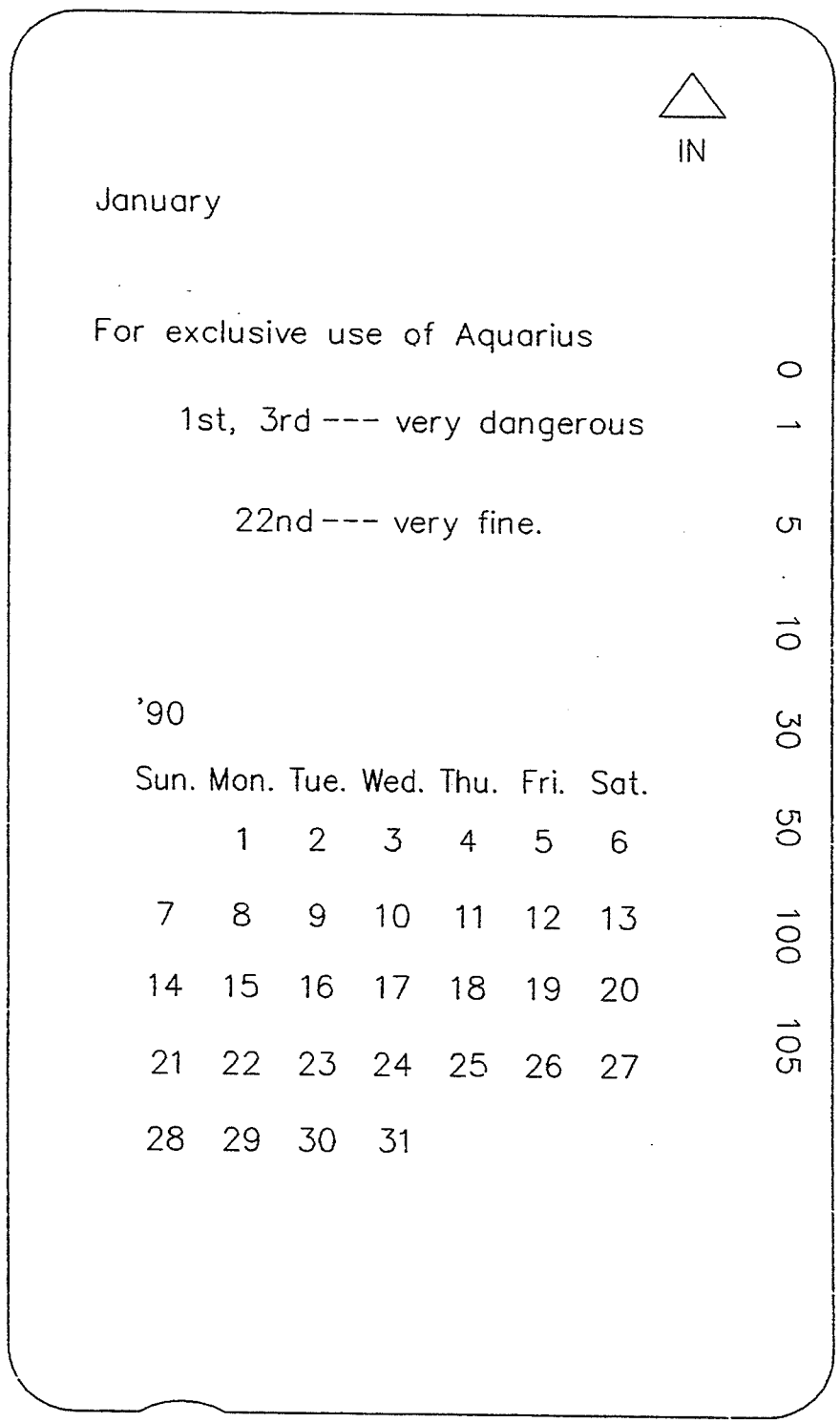

FIG. 7 is a drawing to show the sixth example of the present invention. The sixth example is a telephone card prepared solely for the Aquarius in the horoscope. That is, this is a telephone card prepared solely for the specific period of time, which is here a period common to a constellation in the horoscope.

This telephone card has the information on the Aquarius in the horoscope inscribed thereon besides an ordinary calendar for one month.

Therefore, each person can learn instantly the horoscopic information of the month by using a telephone card specifically prepared for the constellation to which he/she belongs.

Figure 8:
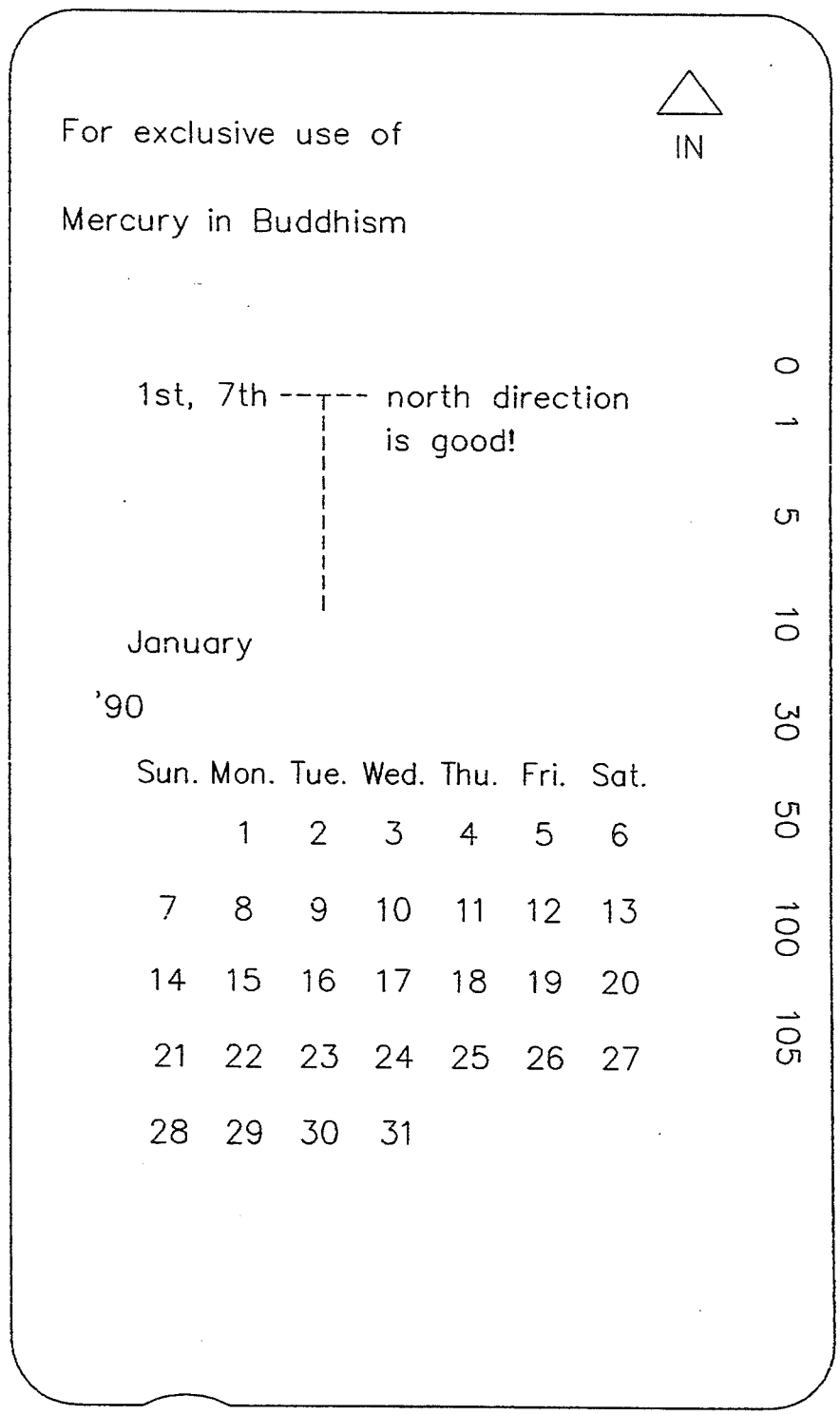

FIG. 8 is a drawing to show the seventh example of the present invention. The seventh example is a telephone card prepared solely for the First White Mercury in the Tetrastyle Destiny. That is, it is a telephone card prepared solely for a specific period of time which is here a period of time common to the Star in the Tetrastyle Destiny (the First White Mercury, the Second Black Saturn, the Third Blue-green Jupiter, etc.).

This telephone card has the information on the First White Mercury in the calendar inscribed therein besides an ordinary calendar for one month.

Each person can learn the information on the Tetrastyle Destiny in the calendar from a telephone card prepared for the Star of his/her own by using that card.

While the examples shown in FIG. 5 to FIG. 8 have a calendar for one month inscribed thereon, they can naturally have two or more months.

Also, while the biorhythm information is indicated by curve graphs in FIG. 5 and FIG. 6, the biorhythm information may be indicated with bar graphs or letters, etc. in place of the curve graphs.

Also, a telephone card may only show a biorhythm graph where a calendar is indicated only with a daily scale in the axis of abscissa in the graph.

Also, while the information determined by a specific date or a specific period of time is inscribed with letters in FIG. 7 and FIG. 8, they may be expressed with graphs, etc. in place of the letters.

Figure 9:
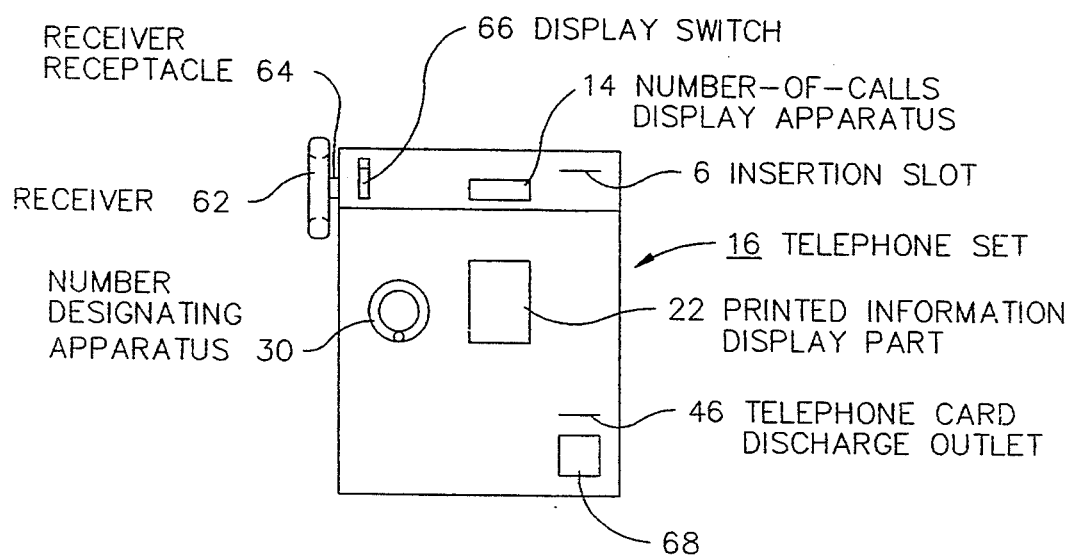
FIG. 9 is a front elevation of a telephone set according to the present invention.
Figure 10:
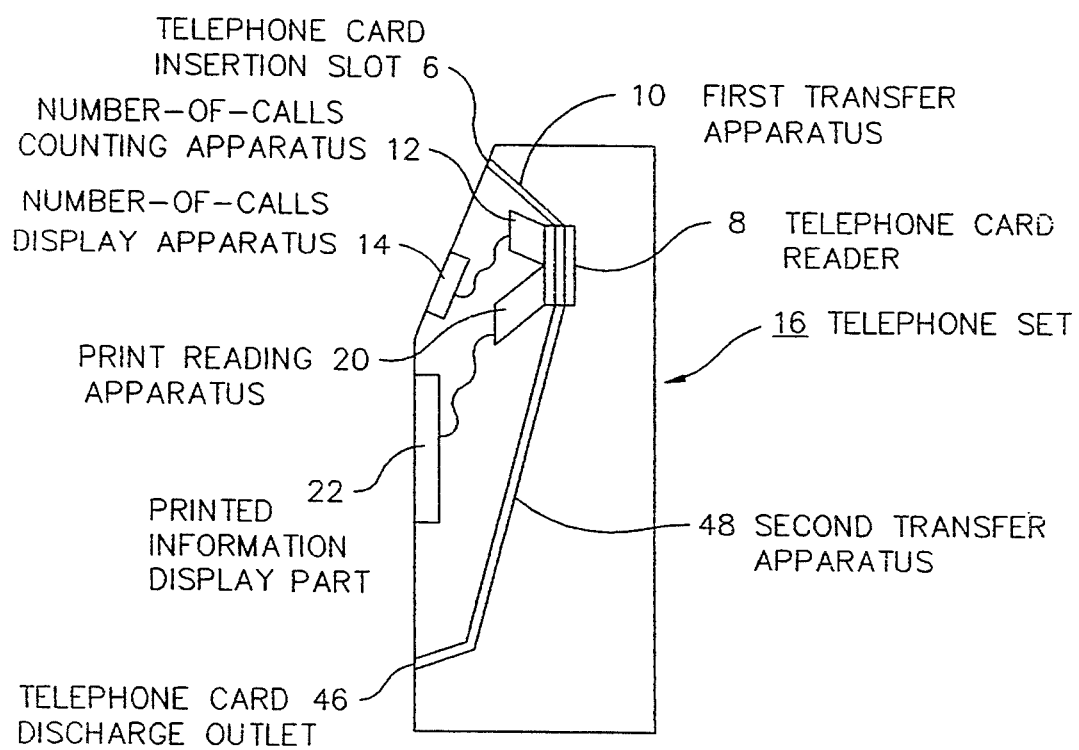
FIG. 10 is a schematic drawing to show an internal structure of a telephone set according to the present invention.

FIG. 9 and FIG. 10 are drawings to show the eighth example of the present invention. The characterizing features of the present invention disclosed therein lie in that a print reading means 20 and a printed information display part 22 are provided in a telephone set 16. The print reading means 20 is to read the printed information on a surface of a telephone card at a telephone card fixing part 8. When a calendar is provided on the telephone card, the calendar is read by the print reading means 20 and the information thus read is transmitted to the printed information display part 22 then the calendar will be displayed to outside. Therefore a user of this telephone set 16 can make a call while looking at the calendar, which will be quite convenient in a case when an itinerary etc. is talked about over the telephone.

Here, an ordinary number-of-calls display is made at a number-of-calls display means 14 through a number-of-calls counting means. Also, the information can be of any kind for the printed information display part as long as the printed information which is read can be displayed outside. A liquid crystal display panel or that which is similar to an ordinary television screen can be used. While the print reading means 20 and the printed information display part 22 are placed at separate positions in his example, the print reading means 20 and the printed information display part 22 may be integrated into an ordinary glass member, when the telephone card fixing part 8 is located close to an external surface. The printed information at the surface of the telephone card positioned at the telephone card fixing part 8 will be read directly.

A telephone card inserted through a telephone card insertion slot 6 is transferred through a first transfer means 10 to the telephone card fixing part 8 and is fixed in position there. Then, the remaining number-of-calls is counted by a number-of-calls counting means 12 and at the same time printed information on the surface of the telephone card is read by the print reading means 20. The remaining number-of-calls thus read is displayed to outside by the number-of-calls display means 14 and at the same time the information printed on the surface of the telephone card which is read is displayed to outside by the printed information display part 22. A connection between the number-of-calls counting means 12 and the number-of-calls display means 14 and between the print reading means 20 and the printed information display part 22 is made respectively by an ordinary electric synchronizing mechanism in this example. Here, as the telephone set is cut off the telephone card is discharged from a telephone card discharging outlet 46 through a second transfer means 48.

Also, a display switch 66 is provided in this example. The display switch 66 is a switch to make a change over of whether the printed information display part 22 and the print reading means 20 are to be activated or not. When not necessary the printed information display part 22 and the print reading means 20 may be stopped by changing over the display switch 66, thus saving power consumption.

Figure 11:
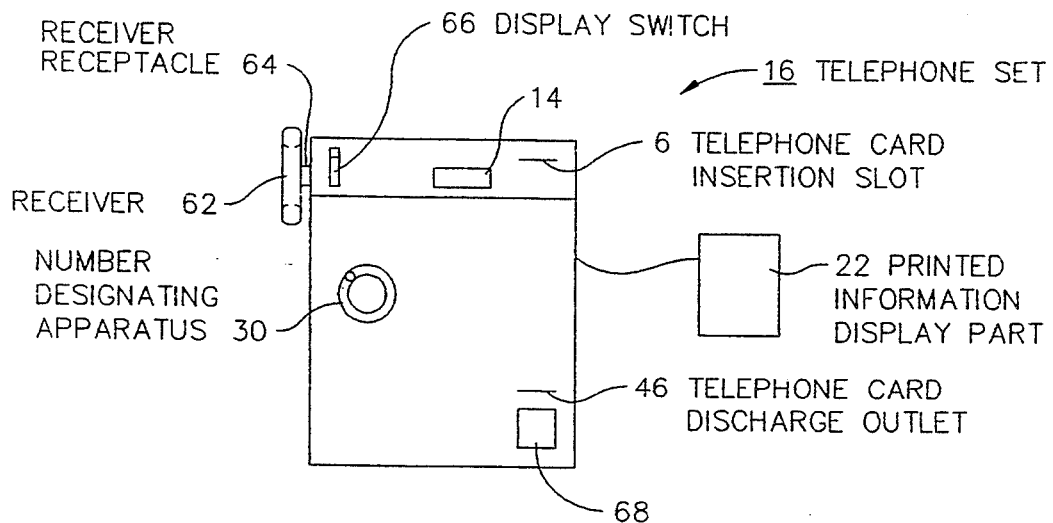
FIG. 11 is a front elevation showing an example of a telephone card using system according to the present invention.

Here, the printed information display part 22 may be mechanically separated from the telephone set 16. A schematic drawing for the same is shown in FIG. 11. The printed information display part 22 is mechanically separated from the telephone set 16 although being electrically connected. As the printed information display part 22 is not housed inside, a weight of the telephone set 16 can be reduced.

FIG. 12 to FIG. 15 show the ninth example of the present invention. The characterizing features of a telephone system 11 according to the ninth example lie in that a telephone card insertion slot 6, a telephone card fixing part 8, a first transfer means 10, a number-of-calls counting means 12, and a number-of-calls display means 14 are formed in a mechanically separate body from a number designating means 30, a means 28 to allow an acceptance of a designated number, a circuit coupling means 32, and a circuit breaking means 38 of a telephone set 16.

Figure 12:
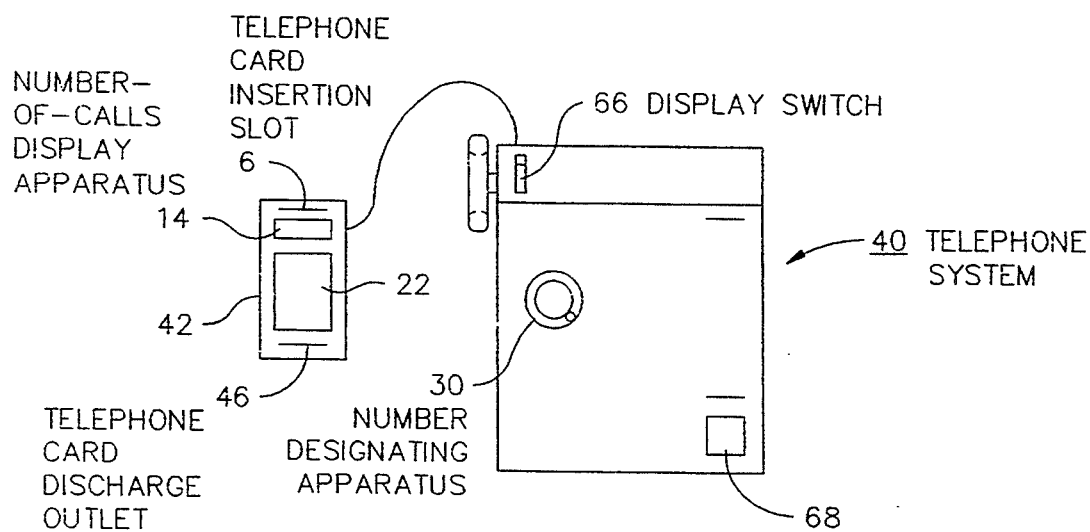
FIG. 12 is a plan showing an example of a telephone system according to the present invention.
Figure 13:
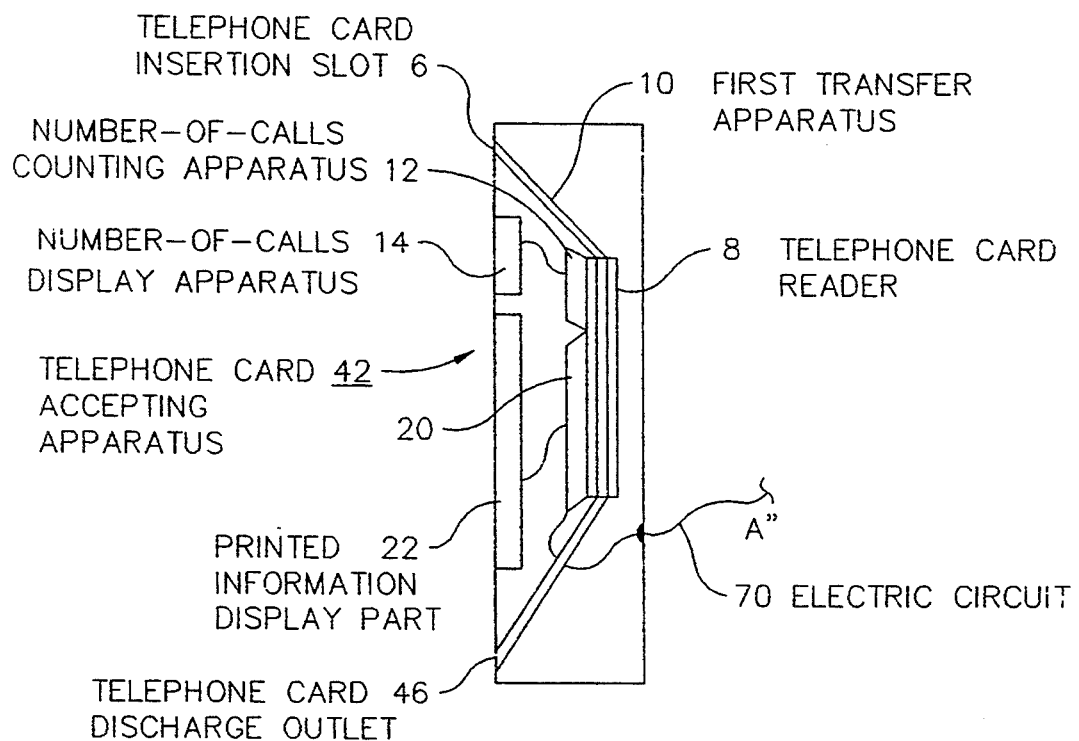
FIG. 13 is a schematic drawing to show an internal structure of a telephone card accepting means according to the present invention.

A telephone card accepting means 42 is formed as a mechanically separate body from the telephone set 16, and comprises the telephone card insertion slot 6, the first transfer means 10, the telephone card fixing part 8, a telephone card discharge outlet 46, the number-of-calls counting means 12, and the number-of-calls display means 14, in its inside, as shown in FIG. 12 and FIG. 13. And it further comprises a print reading means 20 and a printed information display part 22 additionally.

Figure 14:
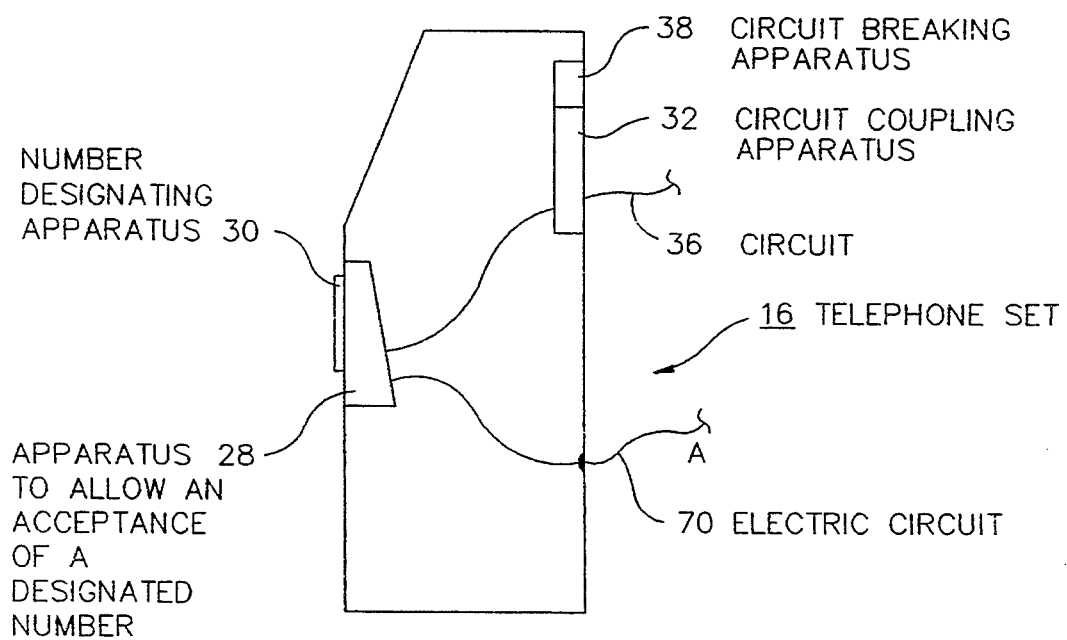
FIG. 14 is a schematic drawing to show an internal structure of a telephone set according to the present invention.

On the other hand, the telephone set 16 comprises, as shown in FIG. 14, the number designating means 30, the means 28 to allow an acceptance of a designated number, the circuit coupling means 32, and the circuit breaking means 38.

And the telephone set 16 and the telephone card accepting means 42 are placed in an electrically connected state as shown in FIG. 12 when they are actually used. That is, an electric circuit 70 in the telephone card accepting means 42 in FIG. 13 and an electric circuit 70 in the telephone set 16 in FIG. 14 are placed in an electrically connected state to each other at a point A.

A telephone card is inserted from the telephone card insertion slot 6 of the telephone card accepting means 42 and is fixed at the telephone card fixing part 8 through the first transfer means 10. The remaining number-of-calls in the telephone card fixed at the telephone card fixing part 8 is counted by the number-of-calls counting means 12 and the remaining number-of-calls is displayed to outside by the number-of-calls display means 14, and at the same time the printed information on a surface of the telephone card is read by the print reading means 20 and the printed information on its surface is displayed to outside by the printed information display part 22.

When the number-of-calls counted by the number-of-calls counting means 12 is not zero, an acceptance of a designated number is allowed by the means 28 to allow an acceptance of a designated number of the telephone set 16 through the electric circuit 70. After that, when a telephone number of a party to be called is designated by the number designating means 30, a state in which a coupling with the party called is possible is secured through the circuit coupling means 32.

After a call is finished a receiver is placed on a receiver receptacle and the circuit to the party called is broken as the circuit breaking means 38 works.

Figure 15:
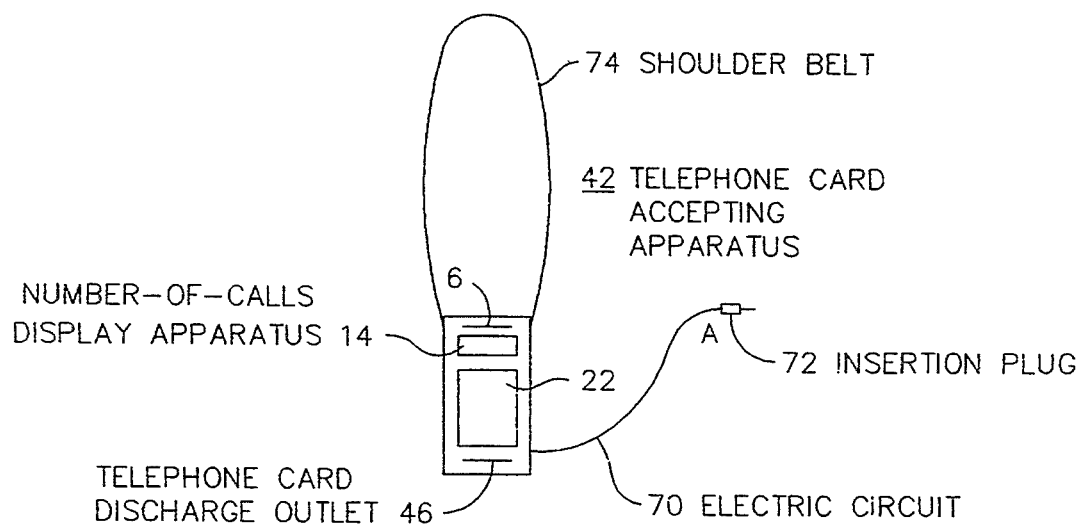
FIG. 15 is a plan showing a telephone card accepting means according to the present invention.

Also, as shown in FIG. 15, an insertion plug 72 may be provided at a forward end of the electric circuit 70 of the telephone card accepting means 42, so that the telephone set 16 and the telephone card accepting means 42 can be placed in an electrically connected state by inserting said insertion plug 72 into an insertion hole (not shown) provided at the telephone set 16. Here, the number 74 represents a shoulder belt attached for a convenience for carrying around.

Therefore, an individual person can make up a telephone system 40 by merely inserting the insertion plug 72 into the insertion hole of the telephone set 16, if he/she has the telephone card accepting means 42 shown in FIG. 15 and as a telephone card is inserted into said telephone card accepting means beforehand. Here, a driving power source for the number-of-calls counting means, etc. is a battery, etc. not shown.

Therefore, the insertion and removal of a telephone card, which was necessary previously, become unnecessary, thus providing an improved handling characteristics.

Concerning the telephone set 16, a telephone card fixing part 8, which existed before, is eliminated, thus a reduction in weight and simplification are achieved and at the same time a reduction in bulk and size can be made.

While the number-of-calls counting means 14 is built in the telephone card accepting means 42 in this example, it may be placed in the telephone set 16. As the number-of-calls display means 14 is eliminated, the telephone card accepting means 42 can be made to have a light weight and a small size. In this case, the remaining number-of-calls counted by the number-of-calls counting means will be displayed by the number-of-calls display means 14 in the telephone set 16 through the electric circuit 70.

Here, when a telephone card having a calendar function is used the calendar information thereof is displayed to outside by the print reading means 20 through the printed information display part 22, thus a caller can make a call while looking at the calendar, providing a convenience.

Also, while a telephone card accepting means in the above mentioned telephone system has a number-of-calls counting means, a part of the number-of-calls counting means may be brought to the telephone set for a purpose of reducing the weight of the telephone card accepting means. Also, if a need may be limited to a function to see whether a call can be made at all or not, an omission of the number-of-calls display means may be made.

Figure 16:
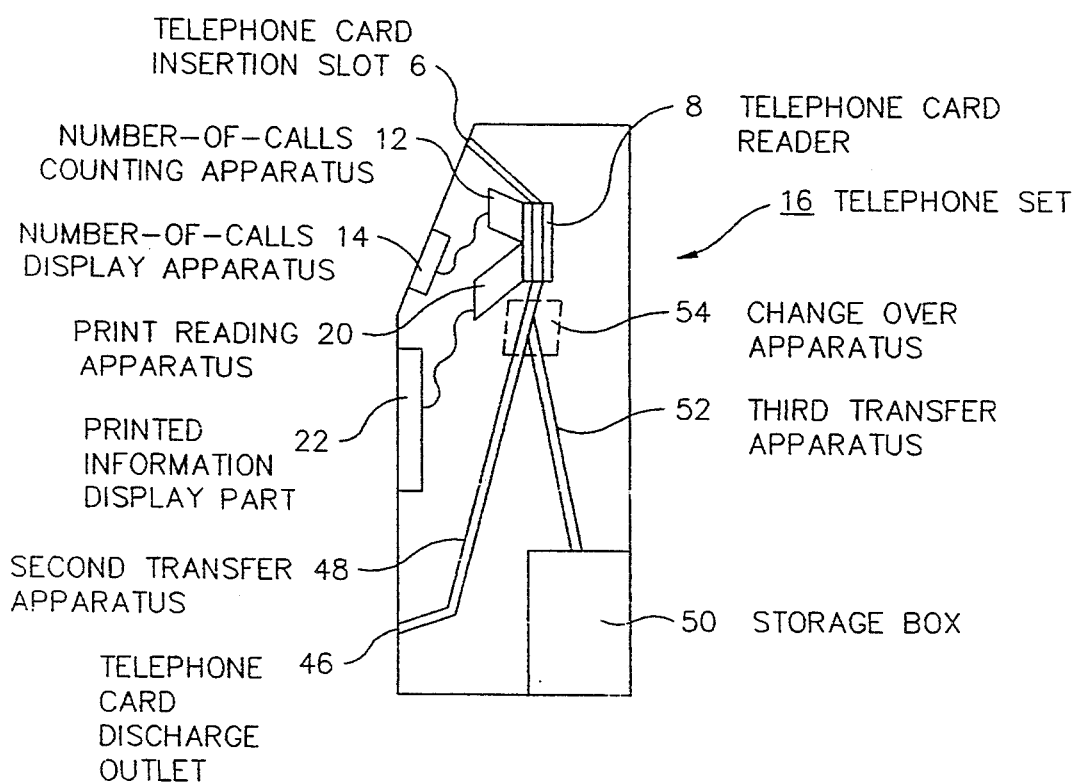
FIG. 16 is a schematic drawing to show an internal structure of an example of a telephone set according to the present invention.
Figure 17:
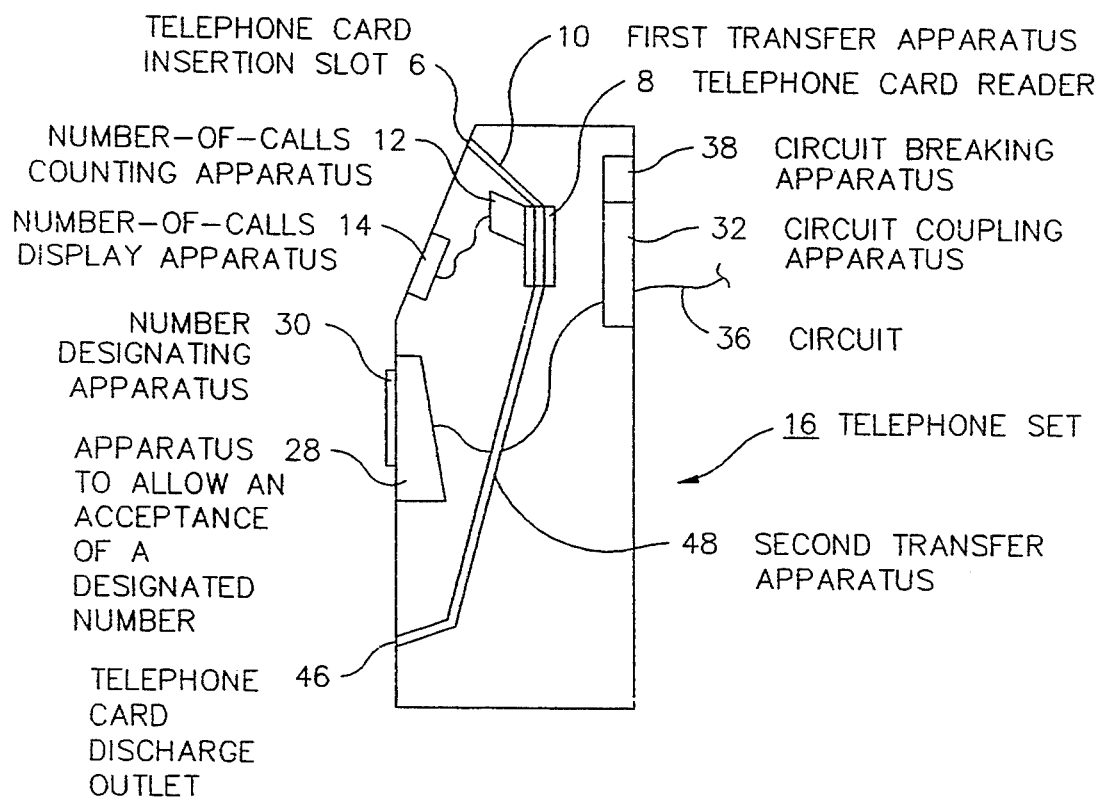
FIG. 17 and FIG. 18 are respectively a schematic drawing for an internal structure of a conventional type of a telephone set and a front elevation for the same.
Figure 18:
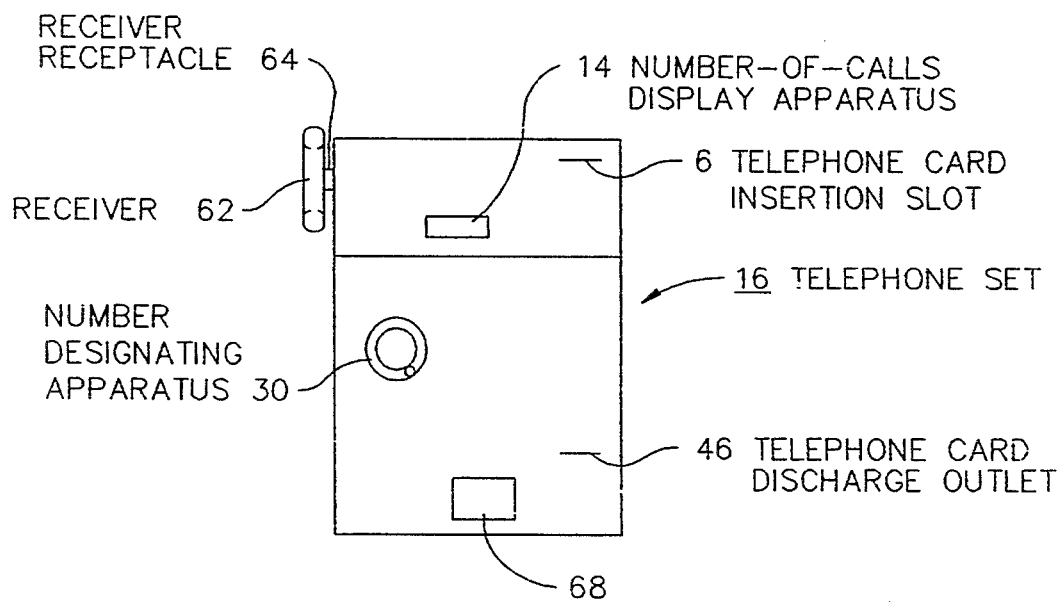

FIG. 16 is a schematic drawing to show the tenth example of the present invention. The characterizing features of this example lie in that a third transfer means 52 for transferring a telephone card to a storage box 50 is provided besides that the telephone card from a telephone card fixing part 8 is discharged at a telephone card discharging outlet 46 through a second transfer means 48.

When the remaining number-of-calls is determined as zero by the number-of-calls counting means 12, a change over is made to the third transfer means 52 side by a change over means 54 and a telephone card is sent to a storage box 50.

As telephone cards having zero remaining number-of-calls will not be directly discharged, a scattering of used up telephone cards will be eliminated, thus contributing to a beautification of environment.

Here, if even telephone cards with zero remaining number-of-calls are wanted back, it can be achieved by a change over of the change over means 54 from outside.

Here, if the storage box 50 is made as detachable from the telephone set 16, it will be convenient for mounting and dismounting.

What is claimed is:

1. A telephone set having a telephone card insertion slot into which a telephone card is insertable, a telephone card reader, a transfer means for transferring said telephone card from said telephone card insertion slot to said telephone card reader, a number-of-calls counting means for counting the remaining number-of-calls that can be made on said telephone card at said telephone card reader, and a number-of-calls display means for displaying said remaining number-of-calls, wherein the improvement comprises print reading means for reading printed information on a surface of the telephone card and a printed information display part for displaying said printed information while the card is in the reader, such that said telephone card reader and said printed information display part are mechanically separate bodies and said printed information display part and said print reading means are electrically connected to each other by an electrically synchronizing mechanism.

2. A telephone system having a telephone card insertion slot into which a telephone card is insertable, a telephone card reader, a transfer means for transferring said telephone card from said telephone card insertion slot to said telephone card reader, a number-of-calls counting means for counting the remaining number-of-calls that can be made on said telephone card at said telephone card reader, a number-of-calls display means for displaying the remaining number-of-calls that can be made on said telephone card, a phone number designating means, a means to allow acceptance of a designated phone number when the remaining number-of-calls on the telephone card is not zero, a circuit coupling means for allowing communication with a party called by operating said phone number designating means, and a circuit breaking means for disconnecting the communication allowed by said circuit coupling means, wherein said telephone card insertion slot, said telephone card reader, said transfer means, and said number-of-calls counting means are formed as a mechanically separate body from said number designating means, said means to allow acceptance of a designated number, said circuit coupling means, and said circuit breaking means.

3. A telephone system according to the claim 2, wherein said telephone card insertion slot, said telephone card reader, said transfer means, said number-of-calls counting means, and said number-of-calls display means are electrically connectable to outside telephone sets.

4. A telephone system according to the claim 2, wherein said means to allow acceptance of a designated number, said number designating means, said circuit coupling means, and said circuit breaking means are electrically connectable to said telephone card insertion slot, said telephone card reader, said transfer means, said number-of-calls counting means, and said number-of-calls display means.

5. A telephone system having a telephone card insertion slot into which a telephone card is insertable, a telephone card reader, a transfer means for transferring said telephone card from said telephone card insertion slot to said telephone card reader, a number-of-calls counting means for counting the remaining number-of-calls that can be made on said telephone card at said telephone card reader, a number-of-calls display means for displaying the remaining number-of-calls that can be made on said telephone card, a means to allow acceptance of a designated number when the remaining number-of-calls on the telephone card is not zero, a phone number designating means, a circuit coupling means for allowing communication with a party called by operating said phone number designating means, and a circuit breaking means for disconnecting the communication allowed by said circuit coupling means, wherein said telephone card insertion slot, said telephone card reader, said transfer means, and said number-of-calls counting means are formed as a mechanically separate body from said number designating means, said means to allow an acceptance of a designated number, said circuit coupling means, said circuit breaking means, and said number-of-calls display means.

6. A telephone card system according to the claim 5, wherein said telephone card insertion slot, said telephone card reader, said transfer means, and said number-of-calls counting means are electrically connectable to outside telephone sets.

7. A telephone system according to the claim 5, wherein said means to allow and acceptance of a designated number, said circuit coupling means, said number-of-calls display means, and said circuit breaking means, are electrically connectable to said telephone card insertion slot, said telephone card reader, said transfer means, and said number-of-calls counting means.

8. A telephone set in which a telephone card can be used, having a number-of-calls counting means for counting the remaining number-of-calls that can be made on said telephone card, and a means for transferring said telephone card to a telephone card discharge outlet when the remaining number-of-calls that can be made on said telephone card is determined to be zero, the improvement comprising a means for transferring said telephone card to a storage box to store the telephone cards when the remaining number-of-calls that can be made on said telephone card is determined to be zero, and a change over means for controlling whether the telephone card is transferred to said discharge outlet or to said storage box when the remaining number-of-calls that can be made on said telephone card is determined to be zero.

* * * * *